United States Patent [19]
McSherry et al.

[11] Patent Number: 5,529,449
[45] Date of Patent: Jun. 25, 1996

[54] SAW TIPPED ANCHOR INSERT

[75] Inventors: Thomas W. McSherry, S. Salem, N.Y.; Pierre R. McDuff, Montreal, Canada

[73] Assignee: Titan Technologies, Inc.

[21] Appl. No.: 153,374

[22] Filed: Nov. 16, 1993

Related U.S. Application Data

[63] Continuation-in-part of Ser. No. 965,735, Oct. 23, 1992, Pat. No. 5,308,203, which is a continuation-in-part of Ser. No. 949,425, Sep. 22, 1992, abandoned.

[51] Int. Cl.$^6$ .................................................. F16B 13/04
[52] U.S. Cl. .............................................. 411/31; 411/387
[58] Field of Search ............................. 411/31, 387, 29, 411/178, 30, 386, 395, 184, 399, 424, 166, 187, 188

[56] References Cited

U.S. PATENT DOCUMENTS

| | | | |
|---|---|---|---|
| 126,366 | 4/1872 | Wills | 411/387 |
| 1,762,349 | 6/1930 | Phillips | 411/31 |
| 2,395,063 | 2/1946 | Paulus | 411/188 X |
| 3,202,035 | 8/1965 | Rosselet | 411/31 |
| 3,208,542 | 9/1965 | Fischer | 411/31 X |
| 3,467,209 | 9/1969 | Chromy | 411/31 X |
| 4,402,637 | 9/1983 | Seghezzi et al. | 411/31 |
| 4,601,625 | 7/1986 | Ernst et al. | 411/387 |
| 4,642,012 | 2/1987 | Blucher et al. | 411/395 X |
| 4,741,654 | 5/1988 | Lovisek | 411/188 X |
| 5,039,262 | 8/1991 | Giannuzzi | 411/30 |
| 5,160,225 | 11/1992 | Chern | 411/30 |
| 5,234,299 | 8/1993 | Giannuzzi | 411/31 |
| 5,308,203 | 5/1994 | McSherry et al. | 411/31 |

FOREIGN PATENT DOCUMENTS

| | | | |
|---|---|---|---|
| 2642801 | 8/1990 | France | 411/178 |
| 1225529 | 9/1966 | Germany | 411/395 |
| 231155 | 6/1925 | United Kingdom | 411/387 |

*Primary Examiner*—Rodney M. Lindsey
*Attorney, Agent, or Firm*—Nolte, Nolte, and Hunter

[57] ABSTRACT

An anchor for insertion in wall board and having a cylindrical body with an outer thread and an axial passage and a flanged proximal end and a saw-tipped distal end. The flange at the proximal end may be formed as a hook and the saw-tipped end is provided with access areas about the rim of the distal end adjacent the leading and trailing edges of the saw tooth or teeth.

16 Claims, 6 Drawing Sheets

SAW TIPPED ANCHOR INSERT

This application is a continuation-in-part of application Ser. No. 07/965,735, filed Oct. 23, 1992 now U.S. Pat. No. 5,308,203 which is a continuation-in-part of application Ser. No. 07/949,425, filed Sep. 22, 1992 now abandoned.

BACKGROUND OF THE INVENTION

This invention relates to wall anchors for securing a support fastener and particularly to a cylindrical wall anchor with an outer thread for tapping into wall material such as dry wall, sheet rock and wood comprising the surface material of a hollow "wall" or similar structure. It especially relates to the construction of the distal end of the anchor which provides a circular sawing tip instead of a drill.

Prior art anchors, best typified by the self-drilling inserts disclosed in U.S. Pat. Nos. 4,601,625; 5,039,262; and 5,160,225; provide a closed end drill tip which is not desirable because of the heat of friction generated between the drill and the wall material and because the wall material is pushed and compressed during the drilling process resulting in breakage of the wall material around the bore at the rear surface of the wall and thus in a weakening of the wall's capacity to retain the anchor under stress. When used to penetrate wood panelling, the wood tends to split.

U.S. Pat. No. 5,234,299 to Gianuzzi discloses an open end drill tip with a pair of saw teeth in a saw-toothed configuration which, for the most part, eliminates generating heat by the typical drill tip. However, that anchor retains the concept of drilling by providing a tapered cylindrical surface to maintain the circularity of the drilled hole, by outward radial compression against the bank of the hole, before it is tapped by the thread on the shank portion of the anchor. Also, the saw-toothed configuration has the leading; i.e., cutting edge of each revolving tooth of the drill cutting material from the tip of each saw tooth to the pointed valley where it meets the trailing edge of the next saw tooth. This results in material build-up between the teeth and surface of the hole as it is being drilled because some of the cut material is squeezed into the pointed valley which is a circumferentially limited access area to the central bore.

It is an object of this invention to provide an outwardly threaded insert which has a cylindrical body with an axial through bore, a flange at the end of its proximal extension and a circular saw tip at the end of its distal extension for cutting a hole in the wall and permitting the wall material around which the tip has sawed to enter the axial bore so as not to be pushed and compressed and to "explode" out of the rear surface of the wall or otherwise weaken the seat of the anchor when in place.

In order to eliminate drilling, the circular saw tip of the invention has, in the instance disclosed in application Ser. No. 07/965,735, filed Oct. 23, 1992, been configured to provide the tips of saw teeth separated by flat or curved valleys which separate the sawing action of the revolving teeth to provide revolving spaces for the cut wall material to enter the through bore instead of being pushed to the outside. Optionally and in some applications, preferably, the thread of the anchor of the invention with the just described configuration extends fully between the distal and proximal ends so that tapping immediately follows the sawing action of the circular sawing to prevent any drilling to occur as in Gianuzzi U.S. Pat. No. 5,234,299 with his cylindrical guide surface.

In another embodiment of this invention, it is contemplated to provide a certain amount of outward radial compression between the anchor and wall material as the turning anchor taps the wall material and in this respect, a flat band-shaped compressor or what may be called a wedge strip is provided between the turns of the spiral thread of the anchor. In this construction, the compression between the anchor and wall between the turns of the spiral of the thread adjacent the flanged proximal end of the anchor tightens the seat of the anchor as by wedging.

In yet another embodiment of the invention, drilling and its consequent compression of the sawed material is eliminated both by spacing the saw teeth to provide passage for the loosened material between the teeth and by disposing the cutting edges of the saw teeth outside the outer diameter of the distal end of the anchor. In this construction, the sawed hole is wider than the distal end of the anchor and is, therefore, not affected by the surface of the anchor end. This construction has been designed for penetrating both hard wall material, such as wood and wall board. In the former instance, the anchor is preferably made of zinc.

In a surprising development of the invention, it has been found that a saw tipped anchor having a single saw tooth saws the hole for the anchor seat more efficiently than anchors with plural saw teeth in any configuration. It is believed that this is so because the configuration of the end of the through bore at the saw toothed end is slanted across the anchor axis so that there is more area for the cut wall material to enter. In this embodiment of the invention, the slanted aperture may be made more angled or less angled and the thread may be made to extend across a very extended aperture slanted through an obtuse angle to the axis of the bore.

It is contemplated by this invention that the flanged end of the insert is provided with a recess for receiving a drive tool, such as a power driven screw driver, for rotating the saw-tipped end against and through the wall board and that the interior of the axial bore of the insert is splined along its proximal extension so that a screw fastener may tap the splines as it is screwed into the insert with the flanged end of the insert within the material at the front surface of the wall board. It is also contemplated by this invention that the saw-tipped distal extension which has captured the sawed material passed the teeth of the saw, extends passed the rear surface of the wall board by a distance substantially equal to the thickness of the wall board. Resultingly, the screw fastener, which may be longer than the width of the wall board, after tapping into the splines of the axial bore, which extend from the flanged end of the insert a distance substantially equal to the thickness of the wall board, may then thread into the captured material or act to push the material out of the saw-tipped end of the anchor.

In a preferred embodiment of the invention, the outer diameter of the proximal extension increases from its juncture with the distal extension to its flanged end, while the saw-tipped distal extension of the insert comprises a straight cylinder with a slightly smaller outside diameter than the increasing outside diameter of the flanged proximal extension.

The cylindrical body may be outwardly threaded substantially along its entire length with the height of the thread increasing from the saw-tipped end to the flanged end inasmuch as the sawing action through the wall, rather than drilling, facilitates a quick insertion which is not diminished by the entry of the threads into the wall material surrounding the hole. The increase in the height of the thread from distal end to proximal end together with the increase in diameter of the proximal extension results in a gradual increase in the size of the tapping in the wall material to more gently push the wall material radially about the increasing height of the thread around the insert, thus, again avoiding "exploding" the wall material about the insert during insertion while providing a strong grip between the wall material and insert when in place.

It is also contemplated within the invention to provide a relatively thick cylindrical wall for the saw-tipped distal extension for the sawing operation.

It is yet another object of the invention to provide a flange for the proximal end of the insert which provides anti-rotational lock elements comprising tabs which are integral with the flange and which are axially bendable from a position away from the front surface of the wall in which the insert has been screwed to a position within the wall material where the tabs act as locking elements against rotation which may be caused by the turning of a screw fastener within the insert in either direction.

In one modification of the invention, the saw-toothed end is provided with forwardly extending teeth for sawing through the wall board and with secondary teeth disposed rearwardly and radially inwardly of the forward teeth for mashing the wall board material to assure that the material will not create a blockage of the axial bore. In the embodiment disclosed, the cross-section of the saw-toothed end is octagonal and provides the sawing teeth on a circumference of rotation with a larger diameter than the circumference of rotation of the mashing teeth.

A preferred embodiment of the invention, disclosed in application Ser. No. 07/965,735, filed Oct. 23, 1992, resulted from the discovery that the provision of but two saw teeth disposed 180° to one another about the circumference of the saw-toothed end and separated by flat valleys facilitated the cutting operation at the surface of the wall board and made a cleaner cut through the wall board than the provision of three, four or more cutting teeth. Testing with an insert having two teeth so disposed, surprisingly resulted in the sawed material entering the axial through bore at the saw-toothed end more readily so that there was less material being pushed to the rear surface of the wall. Resultingly, there is less or no tear at the rear surface of the hole. While three or four teeth at the saw-tooth end works very well, it is theorized that a greater number of rotating teeth presents a circular knife to the wall board material being sawed and that fewer teeth present interrupted cutting or slicing edges which more readily permit the disposition of the sawed material into the bore at the saw-toothed end thus presenting less resistance to the rotating teeth.

Specially configured saw teeth disposed radially outwardly of the anchor body and slanted to lead cut material into the anchor through bore provides an anchor for sawing through wood or wall board.

Furthermore, and as discussed above, a further preferred embodiment of the invention is embodied in an anchor with but a single saw tooth, formed as the slanted surface of the aperture at the end of the through bore, which increases the area of the through bore opening at the distal end for wall material to enter.

It has also been found that the disposition of the thread around the body of the insert close to the saw-toothed end results in a pulling action on the insert just as the saw teeth enter the wall and thus a quicker insertion.

In a modification of the invention, the concept of sawing a hole through wall material and providing a tight, wedged seat with the action of the spiral thread and wedge band, is combined with a hook integrally formed at the proximal end of the anchor. The bore may extend from a closed proximal end where the hook is provided to the open distal end provided with the circular saw. The hook insert may be used in ceilings as well as in walls.

The inventive anchors as disclosed are designed for being molded of strong plastic materials such as nylon or a mixture of nylon and KEVLAR (a trademark of DuPont) combined but which may also be made of less strong plastics inasmuch as the friction normally resulting because of drilling operations of prior art inserts, is diminished because of the saw-tipped end of the insert of the invention. These inserts may also be cast in zinc.

Referring first to the embodiment of FIGS. 1–6, the insert 10 comprises a cylindrical body 11 having a proximal extension 12 with a flanged end and a distal extensions 13 with a saw-tipped end. The flanged end is tapered, in screw body fashion, from the flange 14 to just past mid-length of the insert where the saw-tipped section continues as a straight cylinder. The insert is outwardly threaded as at 15 substantially along its length from the flange 14 to the saw teeth 16 of the saw-tipped extension with the height of the thread diminishing from the flange to the saw teeth 16. Starting the thread close to the saw teeth in this and in the other embodiments shown has the effect when the insert is rotated of pulling the insert through the wall just as soon as the saw teeth have cut into the wall.

Internally, the insert is formed with an axial bore 17 splined as at 18 along the proximal section with a phillips screw head recess 19 extending inwardly from the proximal opening of the bore at the flanged end for rotationally driving the insert with a power driven screw driver.

The saw teeth 16 comprise a circular saw with four circumferentially spaced saw teeth at the distal opening of the bore at the saw-tipped end.

Figure 10:
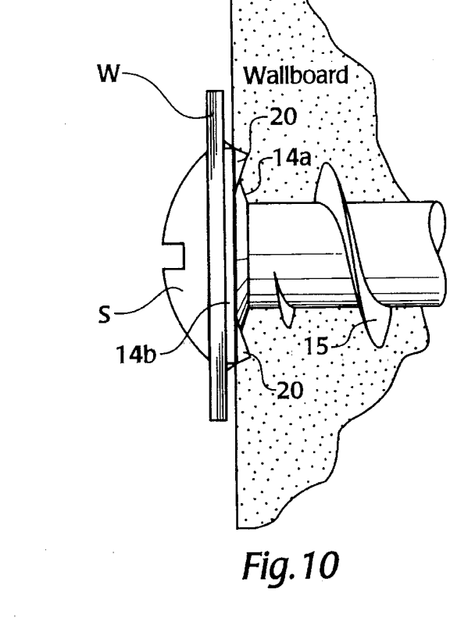
FIG. 10 is a diagrammatic elevational view of an insert of the invention inserted in a dry wall.

The flange extends annularly from the proximal end of the cylindrical insert and has a rearwardly sloped distal side 14a, a circular edge 14b and a flat proximal side 14c. Tabs 20, extending radially from the end of the flanged end of the cylindrical body, interrupt the annular extension of the flange. They are triangular in cross section, their outer surfaces shaped in the form of right triangles, with the apices forming the connections to the cylindrical insert and with the base and hypotenuse surfaces extending away from the flange. These tabs may be pressed into the wall material by work piece W which is secured by the screw fasteners against the wall when the insert is in place as shown in FIG. 10. They may be otherwise pressed into the wall manually or otherwise prior to screw fastener insertion or may be pressed into the wall by the undersurface of a screw head. In all events, when bent into the wall, they act as locking elements against rotation of the insert when the screw is either being screwed in or screwed out of the insert.

Figure 1:
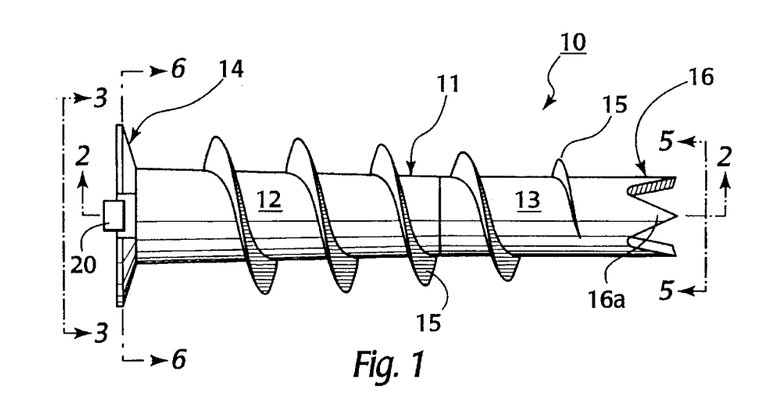
FIG. 1 is a side elevational view of a saw-tipped insert embodying the invention.
Figure 2:
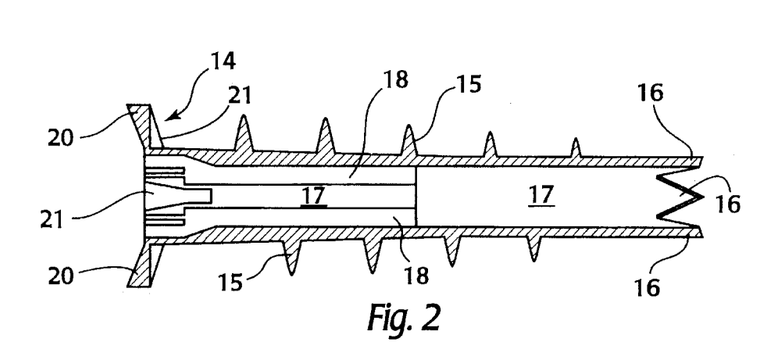
FIG. 2 is a sectional view taken along the lines 2—2 of FIG. 1.
Figure 3:
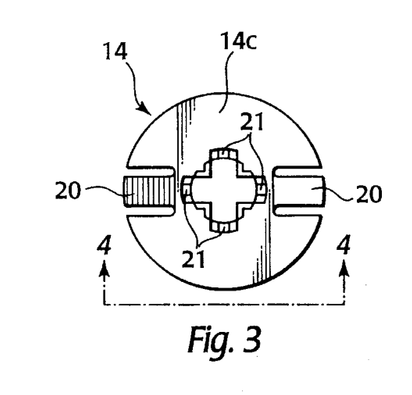
FIG. 3 is an elevational view of the flanged end insert of FIGS. 1 and 2 taken along the line 3—3 of FIG. 1.
Figure 4:
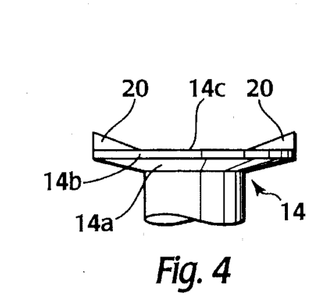
FIG. 4 is a broken away side elevational view of the flanged end of the insert taken along the line 4—4 of FIG. 3.
Figure 5:
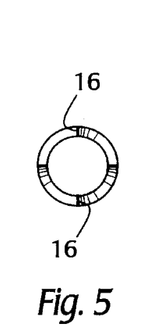
FIG. 5 is a plan view of the saw-tipped end of the insert of FIGS. 1–4 taken along the line 5—5 of FIG. 1.
Figure 6:
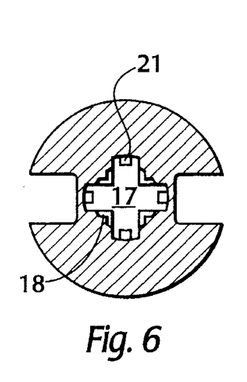
FIG. 6 is a sectional view taken along the line 6—6 of FIG. 1.

Note that the high thread 15 at the proximal end of the insert, together with the shaped distal side of the flange when embedded in the wall will act to compress the wall material in that area and thus resist further forward movement of the insert when the screw is tapping the splines.

Figure 7:
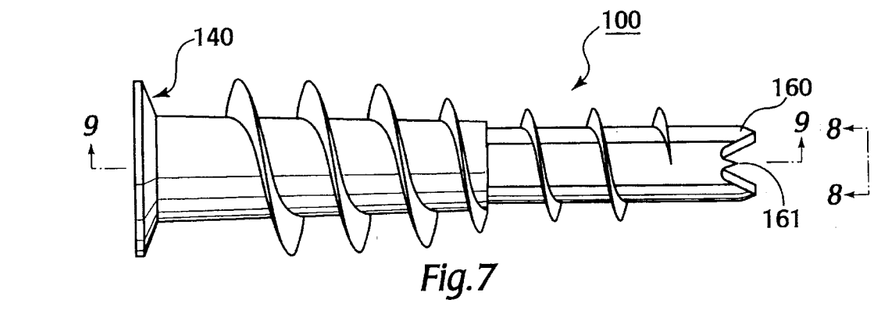
FIG. 7 is a side elevational view of a second embodiment of the saw-tipped insert of the invention.
Figures 8, 9:
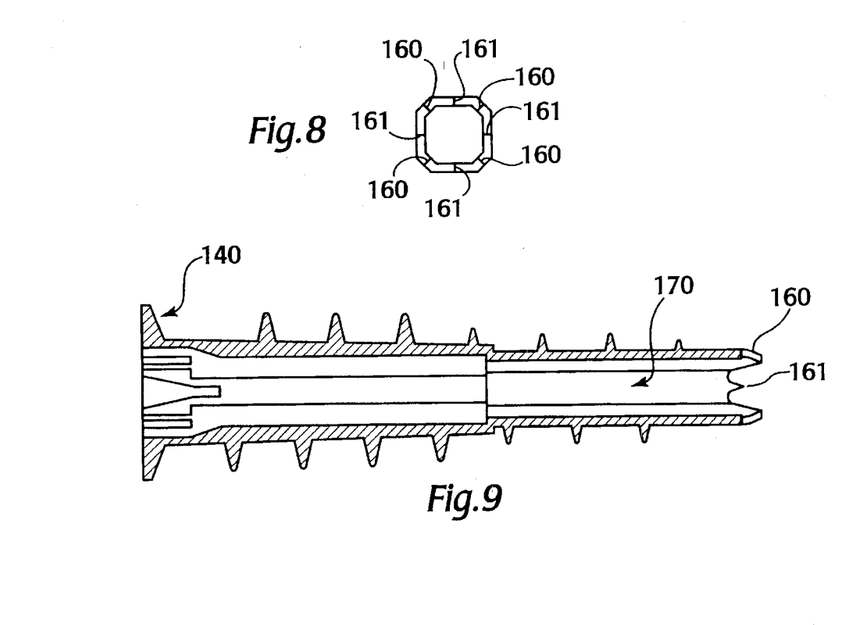
FIG. 8 is a cross-section taken along the line 8—8 of FIG. 7.
FIG. 9 is a plan view of the saw-tipped end of the insert of FIG. 7 taken along the line 9—9 of FIG. 7.

The embodiment of the invention shown in FIGS. 7–9 comprises an insert 100 having a flange 140 at the end of the proximal extension and primary saw-teeth 160 and secondary teeth 161 at the saw-tipped end of the distal extension.

The cross section of the distal extension is an irregular octagonal with long sides and short corners, otherwise the insert of FIGS. 7–9 is substantially the same as the insert disclosed in FIGS. 1–6. It is noted, however, that the tabs 20 are not shown at the flanged end in this embodiment which, as just noted, together with the high thread at the flanged end will provide anti-rotation and forward movement resistance when the screw fastener is tapping the splines.

As seen in the plan view of the tip in FIG. 8, the primary or saw-teeth 160 are disposed along the four short sides of the octagonal tip and the secondary teeth 161 are disposed along the four longer sides of the octagonal tip, thus placing the saw-teeth 160 on a larger circumference of rotation than the secondary teeth. As can be appreciated, the teeth 160, when rotated against the wall material, will cut a wider circle then the secondary teeth 161. The secondary teeth, in fact, mash rather than cut the wall material within the smaller circumference to powder the material so that there will be no clogging of the bore 170 with wall material at the distal extension of the insert.

FIG. 10 is provided to show the insert of FIGS. 1–6 is in place and in which a screw S has been driven to capture a work piece W between the screw head and flange 14 of the insert. In this instance, the workpiece when forced against the tabs 20 bend the tabs into the wall material and act as anti-rotational lock elements so that the worker can complete fastening the workpiece to the wall without incurring screw thread-spline resistance sufficient to turn the insert. Similarly, when the workpiece is removed by unthreading the screw from the insert, the tabs remain in place and resist rotation of the insert so that the insert, in place, may be used once again. Note that the screw head is wide enough to bend the tabs absent a work piece and that the tabs may be bent manually or with the head of a screw driver or other punch tool.

Figure 11:
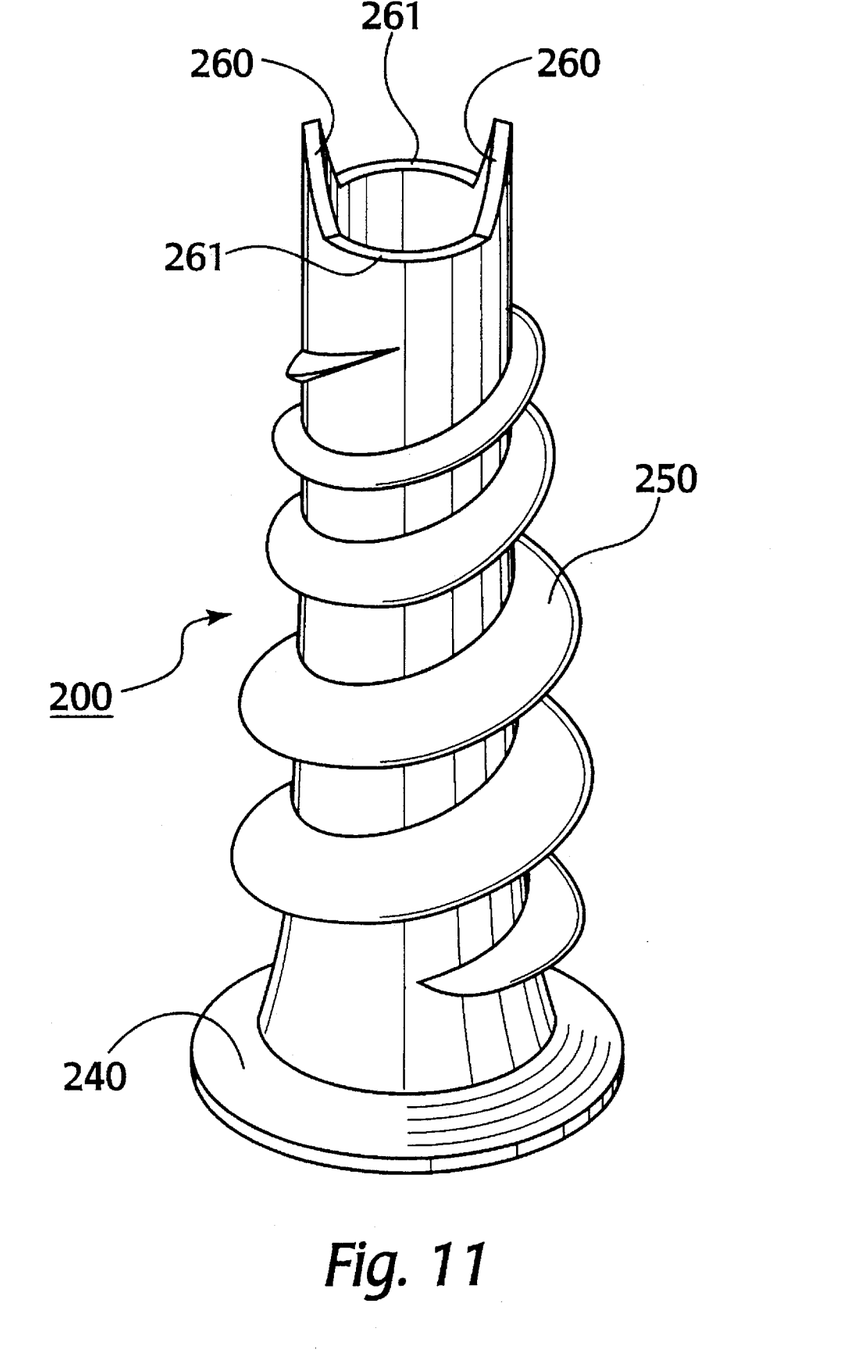
FIG. 11 is a perspective view of a preferred embodiment of the invention in a saw-tipped insert in which only two saw teeth are provided at the saw-toothed end of the insert.

In FIG. 11, the distal edge of the end of a saw tooth insert 200 is provided with but a single pair of teeth 260 disposed 180° from one another in the configuration of peaks separated by flat valleys 261 around the circumference of the tip of the saw-toothed end. The object of providing only two teeth is to quicken the sawing action, as it was discovered in testing of various insert tips that the efficiency of the sawing action of the insert was increased with the disposition of two teeth at the saw-toothed end and that the sawed material entered the axial bore more completely than with more than two teeth. In this embodiment of the invention, as in the others, the thread 250 extends from and diminishes in height from adjacent the flange 240 at the proximal end to the saw-tipped end adjacent the saw teeth 260.

Figures 12, 13, 14:
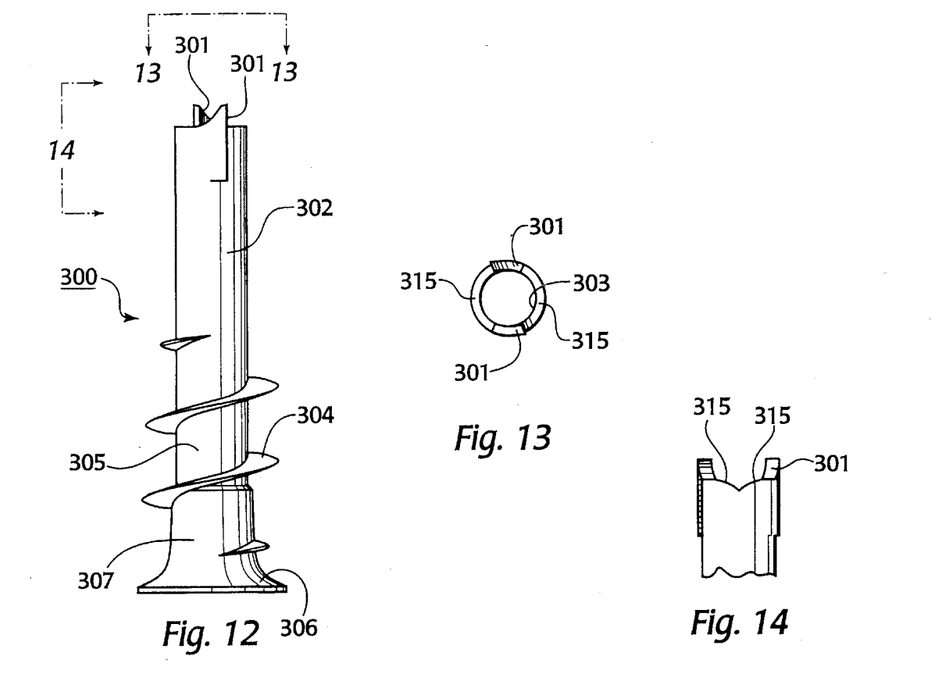
FIG. 12 is a side elevational view of a saw-tipped insert having a thread along its proximal end only and incorporating two saw teeth extended radially outwardly from the cylindrical body of the distal end and having their sawing edges perpendicular to flat valleys.
FIG. 13 is a top plan view of the insert of FIG. 12 taken along the line 13—13 of FIG. 12.
FIG. 14 is a side elevational view of the distal end of the insert of FIGS. 12 and 13 taken along the line 14—14 of FIG. 12.

The anchor 300 of FIGS. 12–14 is constructed for sawing through hard wall material, such as wood or through wall board and, when used for sawing through wood, is made of zinc. The cutting edges of the two saw teeth 301 extend parallel to the long axis of the anchor outside the outer diameter of the distal end 302 of the anchor. This disposition of the saw teeth prevents drilling action which would result if the outer surface of the distal end pressed against the inner surface of the hole defined by the revolving cutting edges of the saw teeth.

As in the anchors of the previous figures, the through bore 303 receives the material sawed loose by the teeth. The thread 304 on the proximal end 305 of the anchor taps the hole sawed by the teeth and advances the anchor through the hole where it is stopped by the flange 306.

The enlarged portion 307 of the proximal end, adjacent the flange, is provided to jam the anchor against the surface of the cut and tapped hole.

In this embodiment, the distal end 302 of the anchor 300 provides flat surfaces 315 fore and aft of the saw teeth angled with respect to one another to form circumferentially extending valleys for the efficient passage of the sawed material to the through bore.

Figure 15:
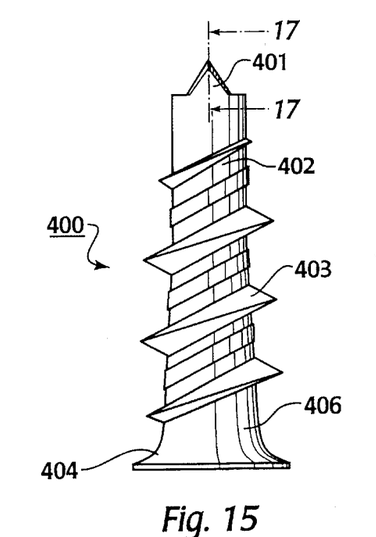
FIG. 15 is a side elevational view of another saw-tipped insert incorporating two saw teeth extended radially outwardly of the distal end with sawing edges sloped with respect to flat valleys.
Figure 16:
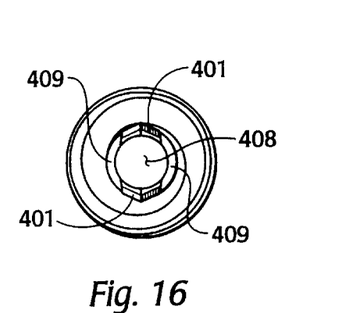
FIG. 16 is a top plan view of the insert of FIG. 15 taken along the line 16—16 of FIG. 15.
Figure 17:
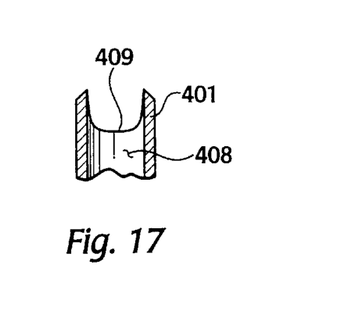
FIG. 17 is a sectional view taken along the line 17—17 of FIG. 15.

The anchor 400 of FIGS. 15-17 is provided with a pair of saw teen 401, the cutting edges of which are disposed radially outward of the outside diamter of the distal end 402 of the cylindrical anchor. Flat valleys 409 extend between the saw teeth to provide access to the thrugh bore 408 of the sawed material. The thread 403 extends from the flange 404 of the proximal end 406 to immediately adjacent the saw teeth.

The placement of the cutting edges of the teeth outwardly of the outside diameter of the anchor body assures that no drilling action; i.e., compressing the cut material, takes place before tapping it with the turning thread.

In this embodiment, a controlled radial compression limited to a circumferential area between the grooves tapped by the thread is effected by a raised, flat compression band 410 extending about the cylindrical body of the anchor between the turns of the thread to provide a tight, wedged fit between the anchor and the wall when the anchor is seated.

Figure 18:
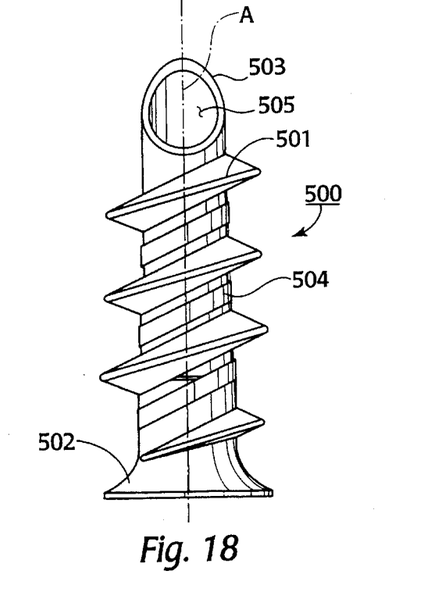
FIG. 18 is a side elevational view of another saw-tipped insert incorporating a single saw tooth configured to provide an aperture slanted across the axis of the through bore at an obtuse angle to the bore axis.
Figure 19:
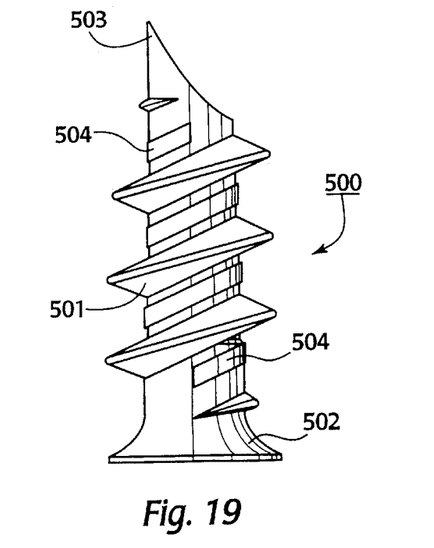
FIG. 19 is a side elevational view of the insert of FIG. 16 taken along the line 19—19 of FIG. 18.

The anchor 500 of FIGS. 18 and 19 comprises a hollow cylindrical body with an external spiral thread 501 extending and diminishing in height from its flanged end 502 to its distal end which terminates in a single saw tooth 503. A wedging compressor band 504 extends around the cylindrical body between the turns of the thread. The single saw tooth 503 is formed by truncating the distal end of the cylindrical body along a slightly curved plane across the long axis A of the anchor at an obtuse angle from the apex of the saw tooth to the nadir on opposite sides of the axis. The plane is curved so that the apex is slightly pointed for initially piercing the wall or ceiling material. By thus truncating the distal end, there is formed flat surface S surrounding the distal opening of the throughbore 505 which provides substantial access to the throughbore for the sawed material, particularly around the area of the nadir where little or no cutting occurs.

Figure 20:
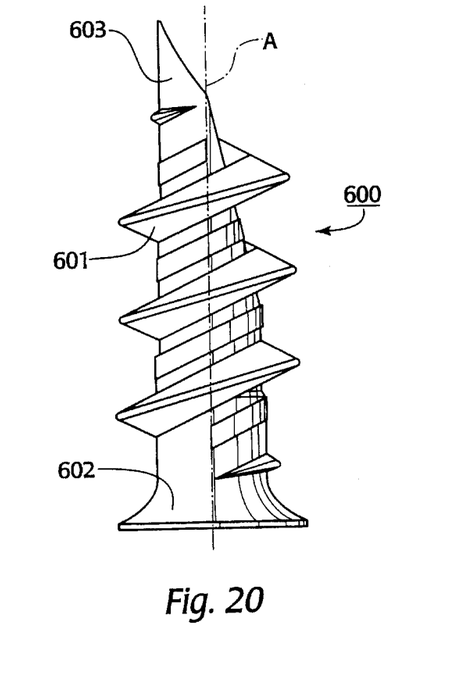
FIG. 20 is an elevational view of another saw-tipped insert incorporating a single saw tooth configured to provide a deeply slanted aperture across the axis of the through bore, and molded to provide the thread imposed over the slanted aperture.
Figure 21:
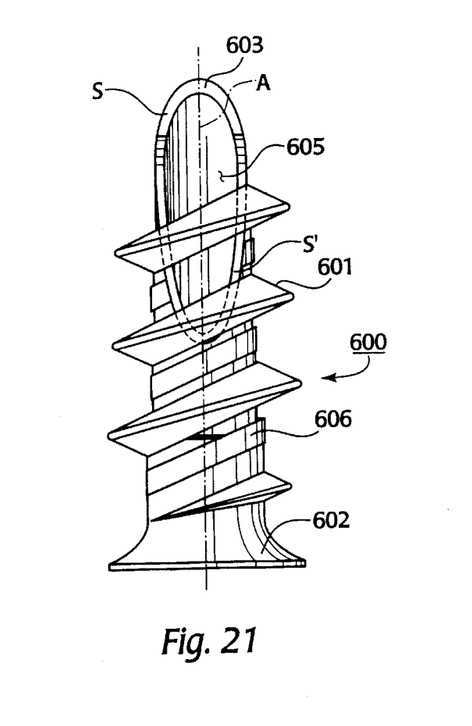
FIG. 21 is an elevational view of the insert of FIG. 20 taken along the line 21—21 of FIG. 20.
Figure 22:
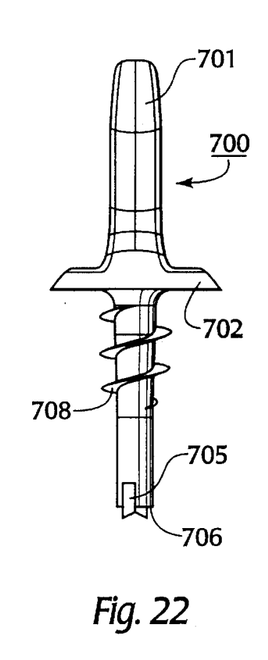
FIG. 22 is a rear plan view taken from the rear of a hook incorporating an integral saw toothed insert.
Figure 23:
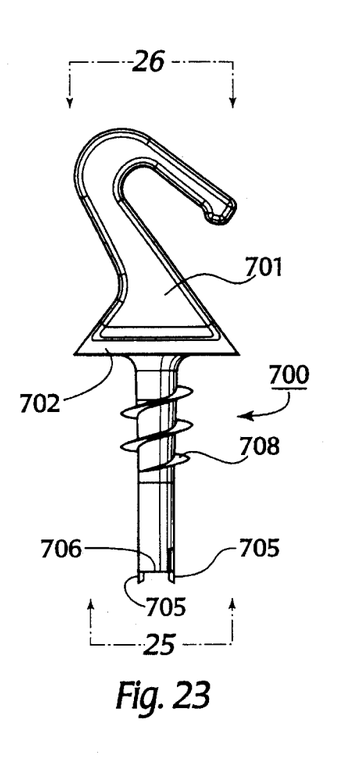
FIG. 23 is a side plan view of the hook of FIG. 22.
Figure 24:
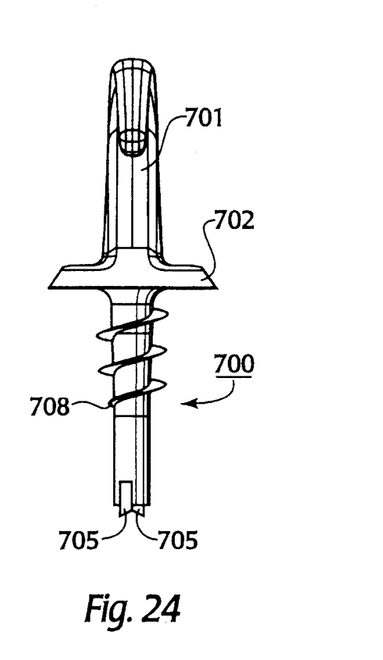
FIG. 24 is a frontal plan view of the hook of FIGS. 22 and 23.
Figure 25:
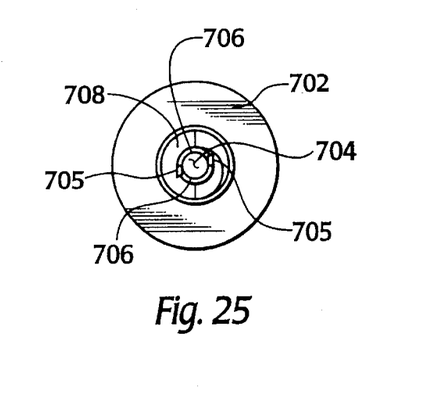
FIG. 25 is a plan view of the hook of FIGS. 21–23 taken along the line 25—25 of FIG. 23.
Figure 26:
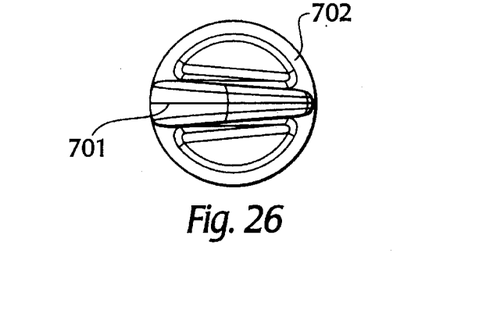
FIG. 26 is a plan view of the hook of FIGS. 21–24 taken along line 26—26 of FIG. 23.

The anchor 600 of FIG. 20 also comprises a cylindrical body threaded as at 601 from its flange 602 to its saw tipped distal end where a single tooth 603 is formed by truncating the distal end of the cylindrical body along two planes; the first along a slightly curved plane at an obtuse angle from the apex of the tooth to a plane through the axis and continuing across the axis A along a plane to the nadir at a severe obtuse angle to about midway between the distal and proximal ends of the anchor. The flat surfaces S, S' surrounding the distal opening of the throughbore 605 particularly the surface S' around the nadir area where little or no cutting occurs provide substantial access to the throughbore 605 for sawed material.

The thread 601 is imposed over the bore opening defined by surface S' so that the thread may extend to adjacent the tooth for immediate tapping upon turning of the anchor. Access for sawed material is thus provided during tapping of the wall or ceiling material. The wedge band 606 is alternatively provided between the spiral turns of the thread.

In FIGS. 22-26, there is disclosed an anchor 700 with a hook 701 formed integrally with and extending from the flange 702 at the proximal end of the cylindrical body of the anchor. In this embodiment, the bore 704 extends from a closed end at the flange 702 to the opening at the distal end of the cylindrical body where a pair of saw teeth 705 are provided at 180° to one another about the periphery of the opening and separated by flat access surfaces. The cutting edges of the saw teeth are parallel to the long axis of the cylindrical body, as in the embodiment of FIGS. 12-14, and, as in the anchor of FIGS. 12-14, are disposed radially outwardly of the outer diameter of the cylindrical body to assure that no drilling action occurs by virtue of the surface of the cylindrical body compressing the material defining the sawed hole.

The thread 708 commences about midway between the flanges 702 and saw tipped end of the anchor. Because of the wedging provided by the tapping of the wall material in a hole which has been sawed rather than drilled so as to maintain the integrity of the material around the hole, it has been found that the hook will sustain pulling forces as great or greater than hooks which have been screwed (tapped) into insert anchors.

Having described the invention with reference to particular embodiments, the claims which determine the metes and bounds of the invention are now set forth.

We claim:

1. A wall anchor for insertion in a wall board with forward and rearward surfaces bounding wall board material therebetween, said wall anchor comprising a cylindrical body extending along a long axis and having a radially extending flange at a proximal end an outer thread extending substantially along the length of said cylindrical body and an axial passage extending from said proximal end of said body to a saw-tipped distal end of said body, saw toothed means extending distally from said distal end, means extending axially along said axial passage from said proximal end for receiving and for being tapped by the threads of a screw fastener, recess means at said proximal end for receiving a drive tool for rotating said anchor for sawing through the wall board with said saw-tipped distal end, said saw tooth means forming with said distal end of said cylindrical body access means surrounding said distal end of said axial passage for passing material sawed from the wall board into said axial passage, said outer thread extending from said proximal end adjacent said flange to adjacent said saw tooth means extending distally from said distal end and comprising means for tapping the wall board material and for pulling said anchor through the wall board material as said saw tooth means rotate without drilling a hole through the wall board in advance of said thread, said outer thread having a high turn adjacent said flanged proximal end, said high turn and said flanged end comprising means, when embedded in the wall material because of rotation of said anchor, for compressing wall material for resisting further distal movement of said anchor when a screw fastener is tapping said means for receiving the threads of a screw fastener.

2. The wall anchor of claim 1 wherein said tooth means comprises at least two saw teeth circumferentially spaced about said distal end surrounding said through passage.

3. The anchor of claim 2 wherein said cylindrical body has a predetermined outside diameter and said two saw teeth each have a leading edge and a trailing edge, said saw teeth extending distally from said distal end, and each said leading edge of each tooth is disposed radially outwardly of the outside diameter of said cylindrical body.

4. The anchor of claim 3 wherein said leading edges extend in planes parallel to said long axis of said cylindrical body.

5. The anchor of claim 4 wherein a raised flat compression band extends between and parallel to the turns of said thread.

6. The anchor of claim 3 wherein a raised flat compression band extends between and parallel to the turns of said thread.

7. The anchor of claim 1 wherein a raised flat compression band extends between and parallel to the turns of said thread.

8. The wall anchor of claim 2 wherein said outer thread diminishes in height from said flanged end to said distal end.

9. The wall anchor of claim 1 wherein said outer thread diminishes in height from said flanged end to said distal end.

10. The anchor of claim 1 wherein a single saw tooth extends distally from said distal end in a plane parallel to the long axis, said saw tooth being formed along a plane truncating said distal end of said cylindrical body from one side of said cylindrical body across the long axis to the other side of said cylindrical body at an obtuse angle, the surfaces formed in said planes forming the apex of said saw tooth on said one side and the nadir of said saw tooth on said other side, said access means extending along the nadir.

11. The anchor of claim 10 wherein said saw tooth is formed along a curved plane.

12. The anchor of claim 1 wherein a single tooth extends distally from said distal end in a plane parallel to the long axis, said tooth being formed along planes truncating said distal end of said cylindrical body from one side of said cylindrical body across the long axis to the other side of said cylindrical body, one of said planes extending from said one side to a plane through the long axis at an obtuse angle, another of said planes extending from the plane of the long axis to said other side of said cylindrical body at an obtuse angle greater than the angle formed by said one of said planes, the surfaces formed in said planes forming the apex of said tooth on said one side and the nadir of said tooth on said other side, said access means extending along the nadir.

13. The anchor of claim 12 wherein the portion of said tooth formed on said one side of said cylindrical body is formed along a curved plane.

14. The anchor of claim 10 wherein said outer thread extends from said flanged proximal end to adjacent the apex of said tooth 15. The anchor of claim 12 wherein said outer thread extends from said flanged proximal end to adjacent the apex of said tooth.

16. The anchor of claim 15 wherein a raised flat compressor band extends between and parallel to the turns of said thread.

* * * * *